United States Patent [19]

Kimmerly et al.

[11] Patent Number: 5,628,017

[45] Date of Patent: May 6, 1997

[54] METHOD AND SYSTEM FOR PROVIDING EVENT-RESPONSE CAPABILITIES TO PSEUDOCODE

[75] Inventors: Randy S. Kimmerly; Robert E. Saile, both of Redmond, Wash.

[73] Assignee: Microsoft Corporation, Redmond, Wash.

[21] Appl. No.: 593,544

[22] Filed: Jan. 29, 1996

Related U.S. Application Data

[63] Continuation of Ser. No. 31,566, Mar. 15, 1993, abandoned.

[51] Int. Cl.$^6$ .................................................. G06F 9/40
[52] U.S. Cl. .................. 395/704; 395/707; 395/682; 395/685; 364/280.8; 364/280.9
[58] Field of Search .................................. 395/700, 650, 395/682, 685, 704, 707; 364/280.8, 280.9

[56] References Cited

U.S. PATENT DOCUMENTS

| | | | |
|---|---|---|---|
| 4,866,638 | 9/1989 | Cosentino et al. | 364/521 |
| 4,974,159 | 11/1990 | Hargrove et al. | 364/200 |
| 5,148,544 | 9/1992 | Cutler et al. | 395/725 |
| 5,218,712 | 6/1993 | Cutler et al. | 395/800 |
| 5,237,684 | 8/1993 | Record et al. | 395/650 |

OTHER PUBLICATIONS

Microsoft C/C++ Programming Techniques, 3:43–53 (1991).
Microsoft Windows Software Development Kit, Programmer's Reference, vol. 2: Functions:535–539, 625–626, 894–899, 956–958 (1992).
Petzold, Charles, "Programming Windows 3.1, Third Edition," The Microsoft Guide to Writing Applications for Windows 3.1:175–193, 907–929 (1992).
Microsoft Visual Basic Programming System for Windows: Professional Features:7–14, 57–63 (1992).
"Windows System Timers; Icon Questions; Rotating a Bitmap; Handling a Joystick" by Paul Bonneau Windows–DOS Developer's Journal Oct. 1992 v3 n10. p. 27(12).
"Dusting Off Applications" by Ronald Albury, UNIX Review Jan. 1991 v9 n1 p. 40(5).
"Within Technologies Inc: Realizer 1.0", Julian Milenbach PC Week Sep. 16, 1991 v8 n37 p. 103(3).
"Microsoft Unveils Code–Crunching C 7.0 Compiler" by Karen D. Moser, PC Week Sep. 2, 1991 v8 n35 p. 1(2).

(List continued on next page.)

*Primary Examiner*—Alvin E. Oberley
*Assistant Examiner*—Michael T. Richey
*Attorney, Agent, or Firm*—Seed and Berry LLP

[57] ABSTRACT

A method and system for providing event-response and monitoring capabilities to a pseudocode program operating in a message or event-based operating environment. The method and system allow the pseudocode program to asynchronously respond to events via one or more trap routines located in the pseudocode program. The method and system also allow the pseudocode program to synchronously monitor events and receive parameters from operating system routines via callback routines located in the pseudocode program. The system includes an execution engine for executing instructions of the pseudocode program. An event-response routine in the pseudocode program includes instructions for responding to the event. An event-response dispatcher is adapted to receive information identifying the event-response routine, save the execution state of the execution engine, cause the execution engine to execute the event-response routine, and restore the execution state of the execution engine that existed before the event-response routine was executed. A transfer routine accessible in response to a call triggered by the event accesses the event-response dispatcher, passes information identifying the event-response routine to the event-response dispatcher, and returns control to the execution engine after the event-response dispatcher restores the state of the execution engine and returns to the transfer routine.

21 Claims, 7 Drawing Sheets

OTHER PUBLICATIONS

"FoxPro 2.0: What's in it for you? " Alan Y. Griver et al. Data Based Advisor Jun. 1991 v9 n6 p. 96(3).

"McDonnell Douglas Presses Software Vendors to Continue with Tuxedo Development", Computergram International Jun. 27, 1991 n1706.

"A Preview of Microsoft c/c++ 7 and the Microsoft Foundation Classes for Windows" by Richard Hale Shaw, Microsoft Systems Journal Mar.–Apr. 1992 v7 n2 p. 43(13).

"Realizer Opens Windows" by Bruce Schatyman, DBMS Nov. 1991 v4 n12 p. 42(2).

"Hook Up with Relational Databases"; Here's Why You Should Link Your Procedural–Language Product to a RDBMS, Data Based Advisor Feb. 1992 v10 n2 p. 74(9).

"GUI Development Tools Take Giant Leap to Fourth Generation" by Steve Gibson, InfoWorld Sep. 2, 1991 v13 n35 p. 35(1).

"Threaded Pseudo Code Gives Microsoft Visual Basic Its Edge" by Steve Gibson, InfoWorld Jul. 1, 1991 v13 n26 p. 30(1).

"Strategies for Optimizing Assembly Language Programs" by Ray Duncan, PC Magazine Nov. 26, 1991 v10 n20 p. 511(4).

"Microsoft Brings Back P–Code; Technique Holds Promise for Future Operating Systems" by Larry J. Seltzer PC Week May 11, 1992 v9 n19 p.61(2).

"A Portable Menu Compiler: Part 5: CMENU" by Leon Zolman, C Users Journal Aug. 1992 v10 n8 p116(11).

"Are your Ready for Cutting Edge COBOL?" by Neel Snell Datamation Oct. 15, 1992 v38 n21 p77(7).

"The Xview Notifier" by Dan Heller, UnixWorld Jul. 1990, pp. 123–133.

Shaw, R., "A Preview of Microsoft C/C++ 7 and the Microsoft Foundation Classes for Windows", Microsoft Systems Journal, Mar. 1992, pp. 43–55.

METHOD AND SYSTEM FOR PROVIDING EVENT-RESPONSE CAPABILITIES TO PSEUDOCODE

CROSS-REFERENCE TO RELATED APPLICATION

This application is a continuation of U.S. patent application Ser. No. 08/031,566, filed Mar. 15, 1993, now abandoned.

TECHNICAL FIELD

The present invention relates generally to computer program interfacing, and more particularly to interfacing pseudocode programs with an event-based operating environment.

BACKGROUND OF THE INVENTION

A computer program is usually written in a language other than the machine language used by the computer to execute the program. The reason is that machine language is not designed for human communication. Because computers utilize two-state storage and switching devices, sequences of binary digits provide the most natural form for expressing program instructions. However, sequences of binary digits are very unnatural for humans to construct or to understand.

The language in which a computer program is written is called source code. A translator is used to translate the source code into machine language understandable by the computer. In some systems, a first translator translates the source code into an intermediate language, such as an assembly language, and a second translator translates the intermediate language into machine language.

There are two basic types of translators: compilers and interpreters. Compilers translate an entire source code program into an object code program that is executed some time later. In contrast, interpreters translate and execute one instruction of a program before translating and executing the next instruction of the program. As such, interpreters do not produce any object code. Compiled programs execute much faster than interpreted programs, resulting in most programs of greater than slight complexity being compiled programs. Interpreted programs have the advantage of being flexible, in that the programs do not have to be recompiled each time a change is made to the program.

Some programs are compiled into an intermediate language known as pseudocode. Pseudocode is executed by a software interpreter which can be referred to as the pseudocode execution engine. The pseudocode execution engine translates and executes program instructions by repeatedly executing a routine known as an interpretive loop. The interpretive loop includes four basic steps:

1. Fetch a pseudocode instruction from a position specified by an instruction counter;
2. Increment the instruction counter;
3. Analyze the fetched instruction to determine what operation is to be performed and the operands for the operation; and
4. Execute the instruction by calling a subroutine for performing the specified operation.

During execution of the interpretive loop, the execution engine uses a stack pointer register, an accumulator register, and possibly other registers of the computer in addition to the instruction counter. The contents of such registers at any time during execution of the interpretive loop are collectively known as the state of the execution engine.

Like most programs, the execution engine interacts with a computer operating system to access hardware devices of the computer. Most advanced operating systems, such as the Microsoft Windows operating system and OS/2, are event- or message-based multitasking systems. In such event-based systems, the user interacts with windows, menus, and controls in a user interface of a program. User-generated events, such as mouse clicks and keystrokes, place "messages" in the program's message queue. The program uses a message loop to get messages from the queue and send the messages to the appropriate window for handling by a window procedure. Each window is associated with a window procedure that responds to the messages received from the message loop. Alternatively, messages can be sent directly from an operating system routine to the window procedure without using the message queue if the operating system routine is given a pointer to the window procedure.

The window procedure is a type of routine known as a callback routine. In general, a callback routine is a routine that receives messages or other information from another routine, such as an operating system routine. The information received can be asynchronous relative to the execution of the callback routine, that is, the information is received at unexpected times. System interrupts and messages received based on user input, i.e. window messages, are examples of asynchronous information. The information received also can be synchronous, that is, information received according to a synchronous execution of instructions. Synchronous information results when a program calls a routine, such as an operating system routine and tells the operating system routine to "call back" to a callback routine in the program. The call back to the callback routine passes information produced by execution of the operating system routine.

Callback routines are used extensively by event-based operating systems, such as the Microsoft Windows operating system. The callback routine arrangement works fine if the program and callback routine are compiled into machine language. However, the callback routine arrangement provided by the Windows operating system does not work for non-machine language pseudocode programs. That is because, unlike the Windows callback routines, a pseudocode program does not have a machine address that can be supplied to the operating system to enable it to find a callback routine within the program.

The Basic language is a well-known example of a source language that typically is compiled into pseudocode and executed by a software interpreter. The Basic language is a relatively simple language and therefore is a popular choice for programmers when writing programs. Such popularity and ease of use creates a need for a system that could provide a pseudocode program, such as a program written in Basic, with the callback capabilities found in the Windows operating system

SUMMARY OF THE INVENTION

The present invention includes a method and system for providing event-response and monitoring capabilities to a pseudocode program operating in a message or event-based operating environment. The method and system allow the pseudocode program to asynchronously respond to events via one or more trap routines located in the pseudocode program. The method and system also allow the pseudocode program to synchronously monitor events and receive parameters from operating system routines via callback routines located in the pseudocode program. One application of the invention is with a pseudocode program that is programmed to debug a test program by allowing the actions of the test program to be monitored.

A preferred embodiment of the invention is directed to a system for responding to an event using a pseudocode program operating in a message-based operating environment. The system includes an execution engine for executing instructions of the pseudocode program, the execution engine having an execution state defined by at least the contents of an instruction counter. An event-response routine in the pseudocode program includes instructions for responding to the event. An event-response dispatcher is adapted to receive information identifying the event-response routine, and includes: means for saving the execution state of the execution engine; means for locating the event-response routine; means for causing the execution engine to execute the event-response routine; and means for restoring the execution state of the execution engine that existed before the event-response routine was executed. A transfer routine accessible in response to a call triggered by the event includes: means for accessing the event-response dispatcher; means for passing information identifying the event-response routine to the event-response dispatcher; means for returning control to the execution engine after the event-response dispatcher restores the state of the execution engine and returns to the transfer routine. In a first embodiment, the transfer routine is a dynamic-link library detector routine and the event-response routine is a trap routine. In a second embodiment, the transfer routine is a thunk routine and the event-response routine is a callback routine.

DETAILED DESCRIPTION OF THE INVENTION

The present invention includes a method and system for providing event response and monitoring capabilities to a pseudocode program operating in a message-based operating environment. The method and system allow the pseudocode program to asynchronously respond to events via one or more trap routines located in the pseudocode program. The method and system also allow the pseudocode program to synchronously monitor events and receive parameters from operating system routines via callback routines located in the pseudocode program. One application of the invention is with a pseudocode program that is programmed to debug a test program by allowing the actions of the test program to be monitored.

Figure 1:
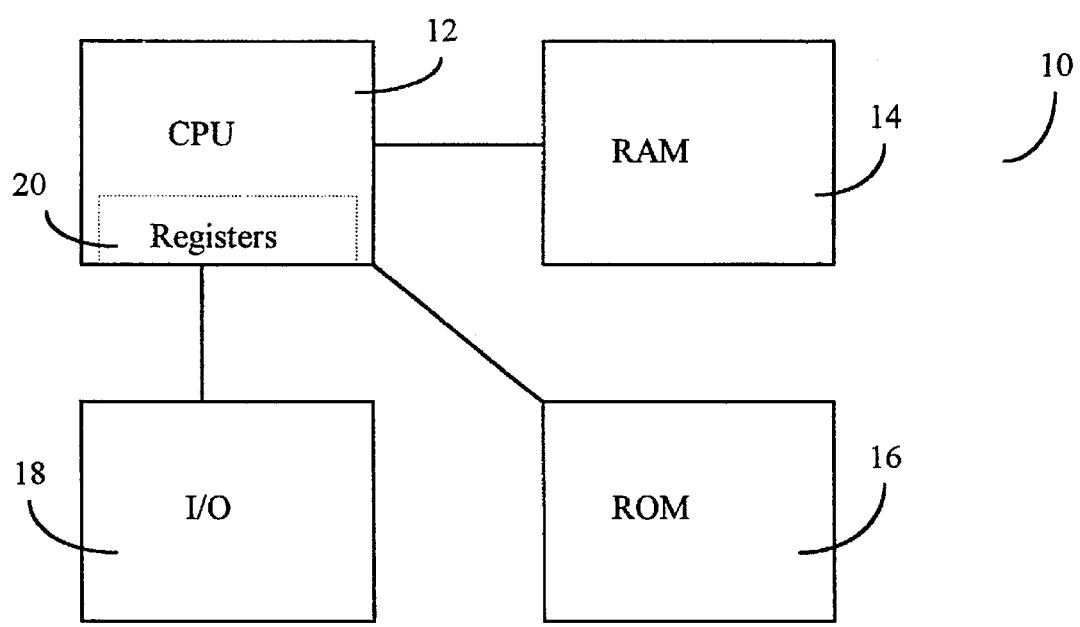
FIG. 1 is a block diagram of a computer system suitable for practicing preferred embodiments of the present invention.

The present invention is intended to be used in conjunction with a conventional computer system 10 as shown in FIG. 1. The computer system 10 includes a central processing unit (CPU) 12, random access memory (RAM) 14, read only memory (ROM) 16, and input/output devices (I/O) 18, such as a keyboard, mouse, disk drive, monitor, and printer. As is conventional, the CPU 12 includes a plurality of registers 20 used by the computer system to store specific pieces of data or information related to activities occurring within the system. The registers typically include an instruction counter, an accumulator, a stack pointer, a data segment pointer, a stack segment pointer, and other miscellaneous registers.

Figure 2:
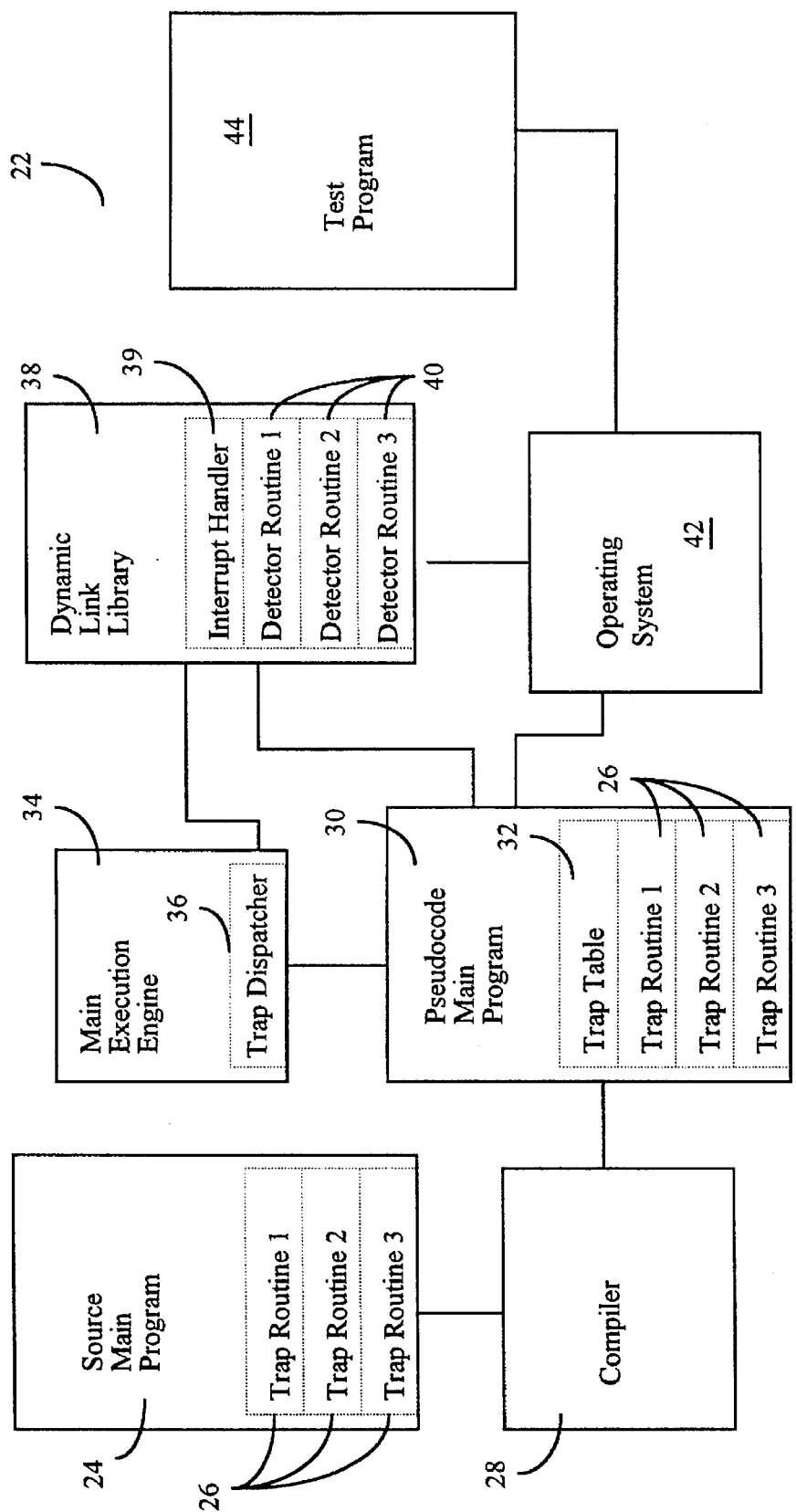
FIG. 2 is a block diagram of an event-response system according to a first embodiment of the present invention.

Shown in FIG. 2 is a preferred embodiment of an asynchronous event-response system 22 of the present invention, which is stored in the RAM 14 shown in FIG. 1. The system 22 (FIG. 2) includes a main program 24 having one or more trap routines 26 programmed to respond to various events that can occur at times not expected by the trap routines. The main program 24 is written in source code that is compiled by a compiler 28 into a pseudocode main program 30. During compilation, the compiler creates a trap table 32 that stores a different index for each trap routine for later access when an event associated with one of the trap routine is detected. The system 22 includes a execution engine 34 that executes instructions of the main pseudocode program. A trap dispatcher 36 within the execution engine causes a trap routine 26 to be executed when its associated event is detected as discussed in more detail below.

The system 22 further includes a dynamic link library (DLL) 38 having DLL detector routines 40 for detecting events, each DLL detector routine corresponding to one of the trap routines 26 in the main program 30. A dynamic-link library is an executable module containing service routines that application programs can call to perform useful tasks. With dynamic-link libraries several application programs can share a single copy of a service routine. If two application programs are running at the same time using the Microsoft Windows operating system and both need a particular service routine, both can share a single copy of the service routine. A more detailed discussion of dynamic-link libraries can be found on pages 877–915 of Petzold, Charles, *Programming Windows*, Microsoft Press, 1990, which is incorporated herein by reference.

In a preferred embodiment, the DLL 38 also includes an interrupt handler routine 41 for detecting software or hardware interrupts. In general a software interrupt is a signal passed by a software routine to trigger certain actions in other software routines or in a hardware device, e.g., the MS-DOS operating system functions are accessed using software interrupts. Hardware interrupts are signals caused by hardware devices and can be external hardware interrupts issued by peripheral devices connected to the computer system or internal hardware interrupts caused by internal system hardware when processing errors are made.

The system 22 is used in conjunction with a message- or event-based operating system 42, such as Microsoft Windows. The preferred embodiments of the invention will be discussed herein with respect to Microsoft Windows, but other event-based operating systems, such as UNIX and OS/2 may also be employed.

In a preferred embodiment, the pseudocode main program 30 is programmed to debug a test program 44 by monitoring the execution of the test program and saving information regarding how the test program executed. Debugging refers to the process of detecting, locating, and correcting logical or syntactical errors in a computer program. Debugging typically is accomplished by providing input data or commands to the test program and observing program execution to determine whether the test program executes as intended.

A debugging program typically observes and stores the contents of registers, the values of variable, indications of whether interrupts were passed, and other information representative of the execution of the test program. Because each test program to be debugged is different, it is helpful if the debugging program used is user-definable for each program to be debugged.

The event-response system 22 assists in debugging the test program 44 by detecting and responding to events that occur during execution of the test routine. The DLL detector routines 40 are programmed to detect whichever events are desired to be detected. When a DLL detector routine detects its event, it notifies its associated trap routine 26 via the trap dispatcher 36. The associated trap routine then responds to the detected event as desired. Each trap routine can be programmed in a known manner to store an indication of the occurrence of the event detected, attempt to remedy any problem evidenced by the event, close the test program 44, or perform any other response to the event.

Figure 3:
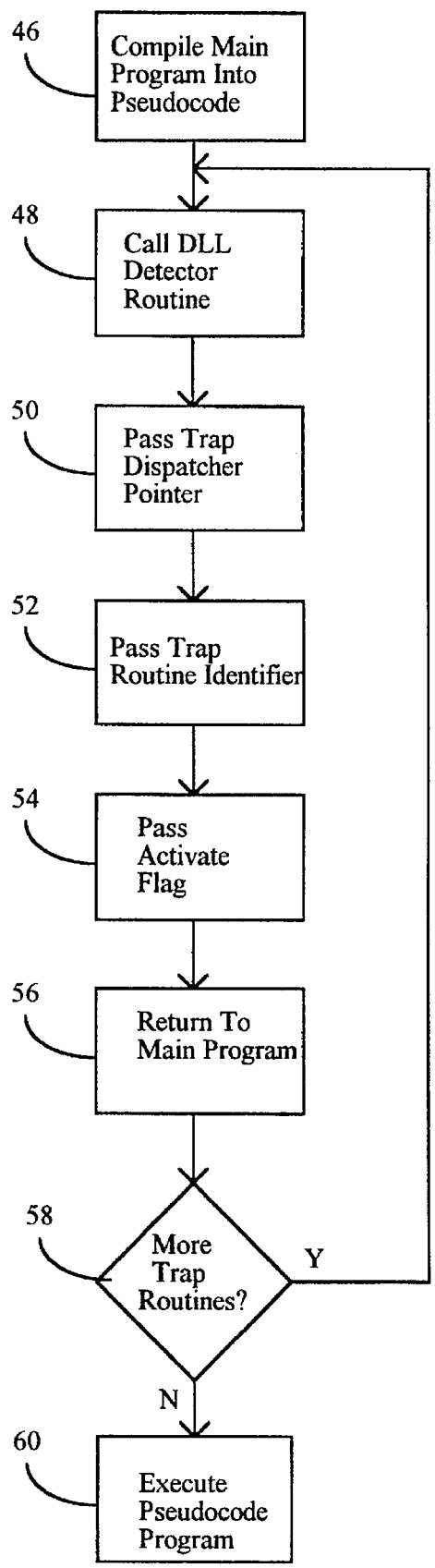
FIG. 3 is a flow diagram of a method for initializing the event-response system of FIG. 2.

The operation of the system 22 begins with an initialization sequence according to the flow diagram shown in FIG. 3. In step 46 the source main program 24 is compiled by the compiler 28 into the pseudocode main program 30, thereby creating the trap table 32. In step 48 the pseudocode main program 30 calls the first DLL detector routine 40 that corresponds to the first trap routine 26 in the main program. The main program 30 passes to the first DLL detector routine a pointer for the trap dispatcher 36 in step 50, a trap identifier for the first trap routine in step 52, and an activate flag in step 54. As discussed in more detail below, when the DLL detector routine detects an event, such as an interrupt or a call to a routine, it passes the trap identifier to the trap dispatcher, which executes the main program trap routine indexed by the trap identifier. The activate flag simply enables the DLL detector routine to detect its event. When it is desired to stop executing the main program 30, the main program sends a deactivate flag to each DLL detector routine to allow the DLL detector routines to perform any clean-up and to disable event detection. In step 56 the DLL detector routine returns execution to the main program 30 by causing the instruction counter to point to the main program. In step 58, the main program determines whether there are more DLL detector routines 40 to call and if there are, repeats steps 48–56 for the next DLL detector routine. When all of the DLL detector routines are processed, the execution engine 36 begins executing the main program 30 in step 60.

When the initialization sequence shown in FIG. 3 is completed, execution of the main program 30 continues until one of the DLL detector routines 40 detects its event, such as an interrupt. Normally, the operating system 42 includes interrupt handler routines for responding to each interrupt in a fixed manner, each interrupt handler routine being accessed by an interrupt vector table that includes interrupt vectors points to an interrupt handler routine for each interrupt. By altering the interrupt vector table pointers to point to the DLL detector routines 40, rather than the normal operating system interrupt handlers, the DLL detector routines become able to detect the interrupts.

When using the Windows operating system (version 3.1), the interrupt handling process can be automated by calling a Windows routine called InterruptRegister and specifying the address of the DLL interrupt handler routine 39. The InterruptRegister routine causes all interrupts to be passed to the DLL interrupt handler routine together with a value identifying which interrupt occurred. The interrupt handler routine calls the appropriate DLL detector routine 40 based on the interrupt value passed, thereby enabling the DLL detector routine 40 to detect its event. A more detailed discussion of the InterruptRegister routine can be found in pages 535–539 of *Microsoft Windows 3.1 Programmers Reference, Volume 2: Functions*, Microsoft Corporation, 1992, which is incorporated herein by reference.

In addition to interrupts, the DLL detector routines 40 can be programmed to detect other events, such as keyboard or mouse input and other window messages. When using the Windows operating system, such events can be detected using a Windows routine called SetWindowsHook. The SetWindowsHook routine sets a hook in the Windows message-handling mechanism that causes the DLL detector routines to receive the messages intended for a Window procedure of the test program 44. Each DLL detector routine passes to the SetWindowsHook routine an identifier of the type of messages to detect and a pointer to the DLL detector routine so that the messages are correctly received. A more detailed discussion of the SetWindowsHook routine can be found in pages 894–899 of *Microsoft Windows 3.1 Programmers Reference, Volume 2: Functions*, Microsoft Corporation, 1992, which is incorporated herein by reference.

Figure 4:
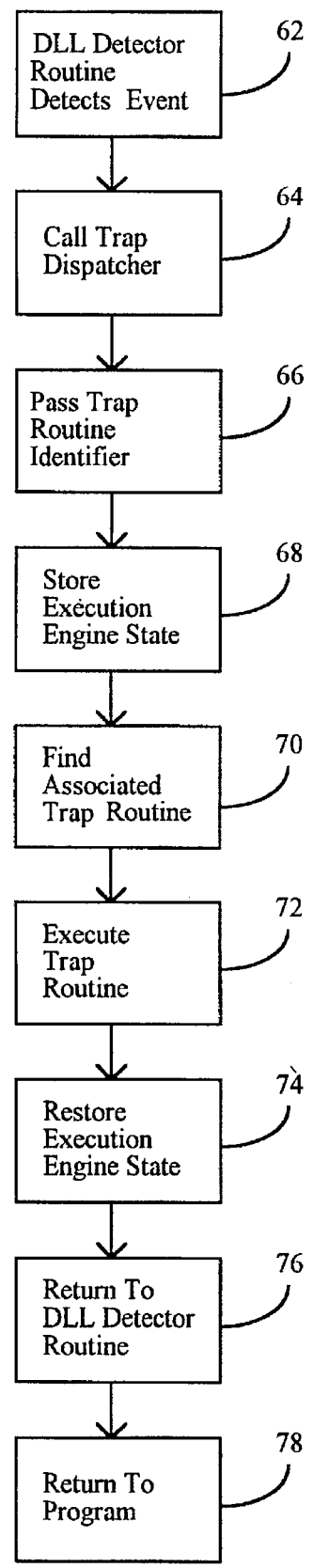
FIG. 4 is a flow diagram of a method for providing event-response capabilities to a pseudocode program according to a first embodiment of the present invention.

FIG. 4 shows how the system 22 operates in responding to any event. In step 62, one of the DLL detector routines 40 detects its event as discussed above. In step 64, the DLL detector routine calls the trap dispatcher 36 using the trap dispatcher pointer that it was given during the initialization sequence (step 50 of FIG. 3). The DLL detector routine passes to the trap dispatcher the trap identifier for the main program trap routine 26 associated with that DLL detector routine (step 66).

When called, the trap dispatcher 36 waits until the execution engine 34 completes executing the current instruction of the main program 30 if any is being executed. The trap dispatcher stores the current "state" of the execution engine 34 so that execution can continue when the system 22 completes its response to the event detected (step 68). The current "state" includes the contents of an instruction counter, a stack pointer, and any other registers used by the execution engine, such as an accumulator register.

In step 70, the trap dispatcher 36 searches the trap table 32 for the trap identifier received from the DLL detector routine 40 to obtain a pointer to the main program trap routine 26 associated with that DLL detector routine. Next, the trap dispatcher causes the main program trap routine to be executed by the execution engine 34 by inputting the trap routine pointer into the instruction counter for the execution engine (step 72). When the main program trap routine 26 is finished executing, the trap dispatcher 36 restores the state of the execution engine 34 that existed when interrupted by the trap dispatcher by reloading the contents of the registers saved by the trap dispatcher (step 74). The trap dispatcher then returns execution to the DLL detector routine 40 that detected the event responded to by the main program trap routine 26 (step 76). The DLL detector routine returns execution to whichever of the main program 30 and the test program 44 was executing when the event was detected.

As discussed above, trap routines 26 can be used to respond to numerous events detected by DLL detector routines 40. However, the trap routines do not provide a way to allow the main program 30 to receive parameters from operating system routines. Many operating system routines require the main program to include callback routines capable of receiving parameters from the operating system routines. For example, the Windows operating system routine EnumFonts produces information identifying each of the fonts available on a specific device such as a printer. In order for the main program to receive the information from EnumFonts the main program must include a routine that EnumFonts can call back to pass the information to the main program.

Figure 5:
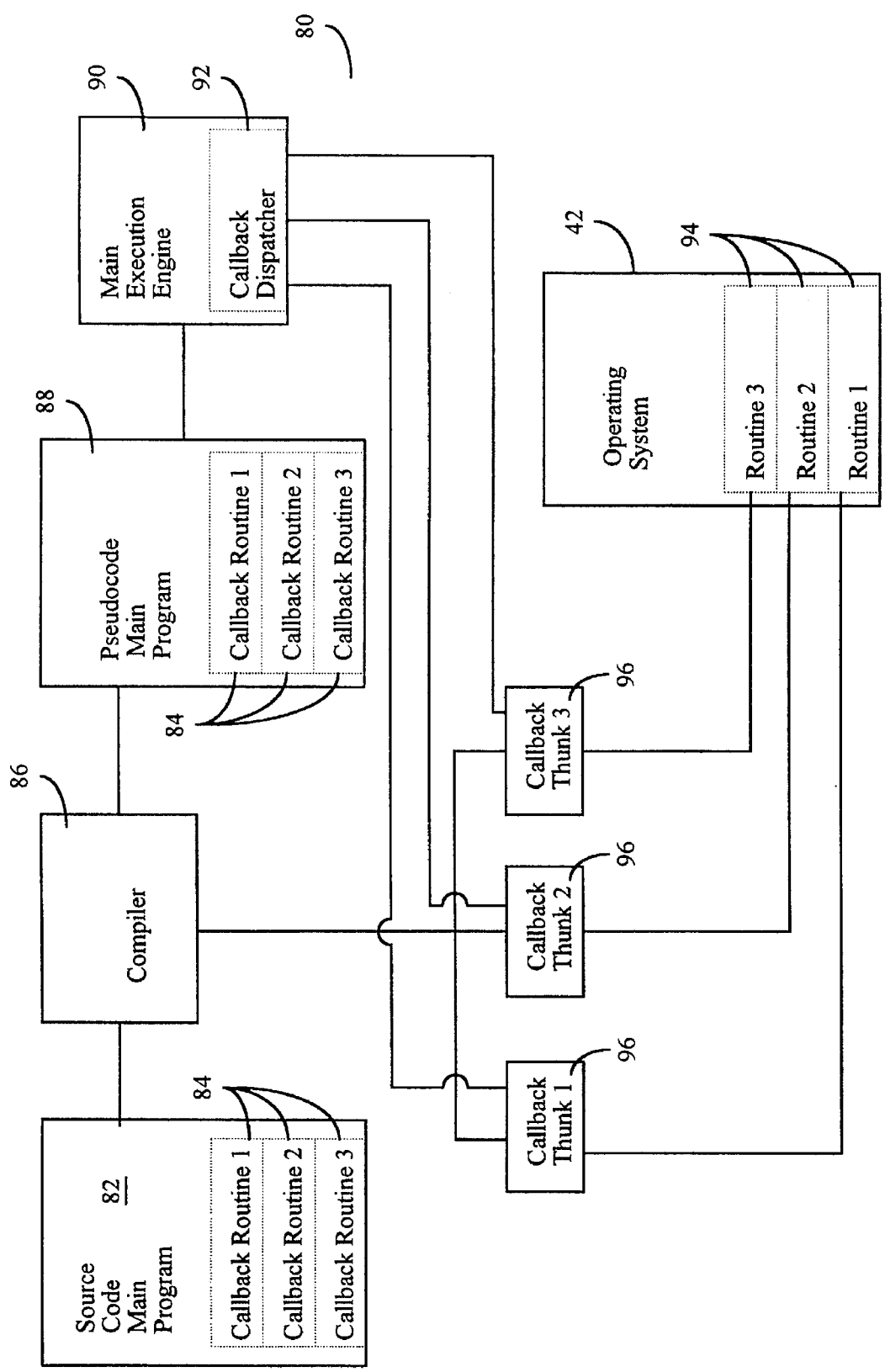
FIG. 5 is a block diagram of an event-response system according to a second embodiment of the present invention.

Shown in FIG. 5 is a preferred embodiment of a synchronous event-response system 80 according to the present invention, which is stored in the RAM 14 shown in FIG. 1. The system 80 includes a main program 82 having one or more callback routines 84 programmed to respond to various expected events. The main program 82 is written in source code that is compiled by a compiler 86 into a pseudocode main program 88. The system 80 includes an execution engine 90 that executes instructions of the pseudocode main program 88. A callback dispatcher 92 within the execution engine causes a callback routine 84 to be executed when its associated event is detected as discussed in more detail below.

Each callback routine 84 exists to receive parameters or messages from an operating system routine 94 provided with the operating system 42. The operating system routine is called by a calling instruction in the source main program 82. The calling instruction typically identifies the operating system routine being called, one or more parameters needed by the operating system routine, and an address of the callback routine programmed to receive information from the operating system routine. Because the callback routine is compiled into pseudocode rather than machine language, the callback routine address identified by the calling statement is a pseudo address, not a machine address. As such, the operating system routine cannot respond directly to the callback routine using its pseudo address.

During compilation of the source main program 82 into the pseudocode main program 88, the compiler 86 creates a machine language thunk routine 96 for each source code calling instruction. Each thunk routine created stores an instance address identifying a data segment used by the execution engine 90 and also stores the address of the callback routine specified in the calling instruction. Because the thunk routine is in machine language, it has a machine address that can be called directly. The operating system routine 94 being called is provided with the machine address of the thunk routine, rather than the address of the associated callback routine.

Figure 6A:
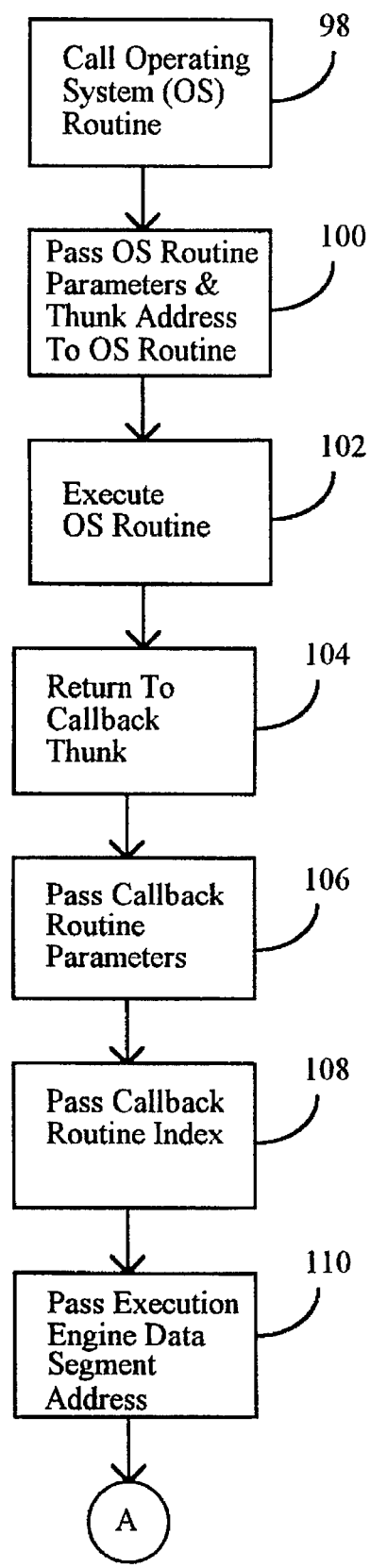
FIGS. 6A and 6B are a flow diagram of a method for providing event-response capabilities to a pseudocode program according to the present invention.
Figure 6B:
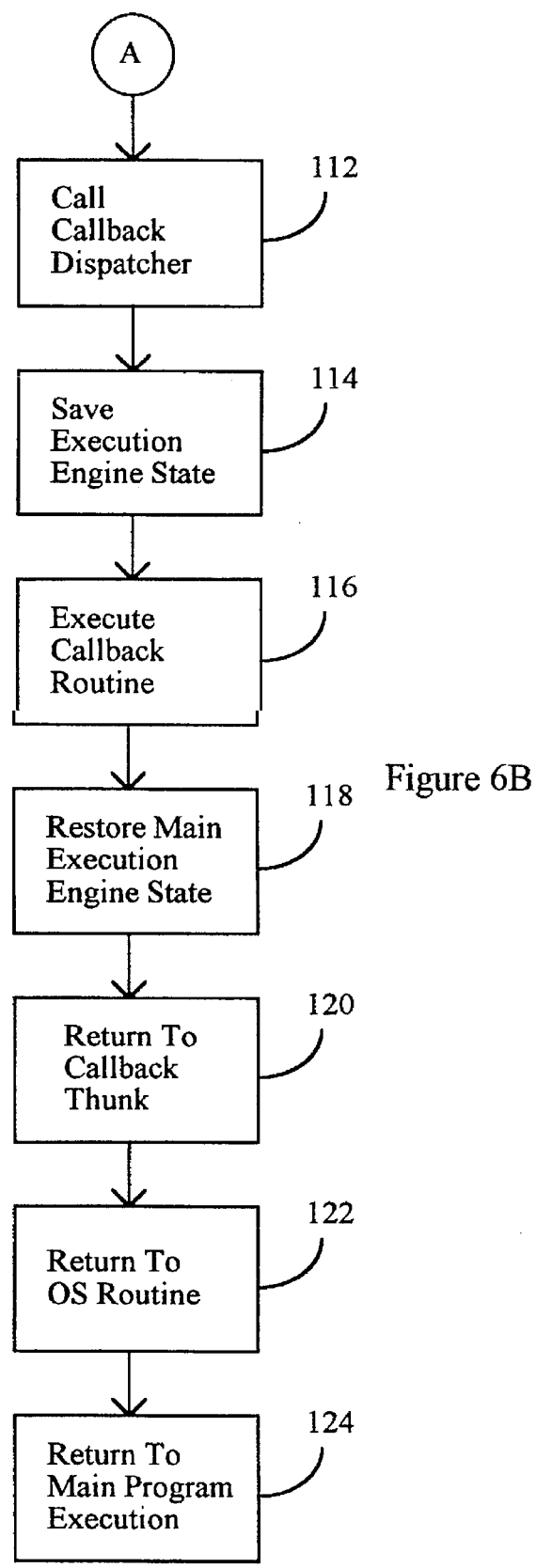

FIGS. 6A and 6B show how the system 80 operates in providing synchronous event-response capabilities. In step 98 a calling instruction in the pseudocode main program 88 calls one of the operating system routines 94. The calling instruction passes to the operating system routine parameters needed by the operating system routine together with the address of the thunk routine 96 associated with the calling instruction (step 100). The operating system routine is executed, thereby creating callback parameters resulting from the operation performed by the operating system routine on the parameters received from the main program calling instruction (step 102). After being executed, the operating system routine returns with the callback parameters to the thunk routine 96 specified by the main program calling instruction (step 104)

In step 106, the thunk routine 96 passes to the callback dispatcher 92 the callback routine parameters received from the operating system routine 94. In step 108, the thunk routine passes the pseudo address of the callback routine 84, which was stored by the thunk routine during its compilation. In step 110, the thunk routine passes the instance address of the data segment used by the execution engine 90, which was also stored by the thunk routine during its compilation. It is necessary to pass the execution engine data segment instance address because when the operating system routine 94 is called, the operating system 42 automatically allocates a new data segment for the operating system routine. Passing the execution engine data segment instance address ensures that the execution engine uses its own data segment when executing the callback routine 84. In step 112, the thunk routine 96 calls the callback dispatcher 92.

When called, the callback dispatcher 92 stores the current "state" of the execution engine 90 so that when the system 80 completes its response to the callback, execution of the main program can continue at the point at which the execution was interrupted (step 114). Next, the callback dispatcher causes the callback routine to be executed by the execution engine 90 by inputting the callback routine pointer into the instruction counter for the execution engine (step 116). When the callback routine 84 is finished executing, the callback dispatcher 92 restores the state of the execution engine 90 that existed when interrupted by the callback dispatcher (step 118). The callback dispatcher then returns execution to the thunk routine 96 that called the callback dispatcher (step 120). The thunk routine returns execution to the operating system routine 94 (step 122), which returns execution to the main program 88.

The trap and callback routines described herein allow a pseudocode main program to respond to events triggered by execution of the main program or any other program being executed. Further, the callback routines described herein allow the pseudocode main program to respond to events that require parameters to be passed from routines external to the main program, such as operating system routines. Such event response capabilities allow emulation of the popular user interface of event-based operating systems, such as the Microsoft Windows operating system, using a program written in a source language, such as Basic, that is compiled into a pseudocode program. The trap and callback routines are particularly advantageously employed in a main program that is written to debug a test program, by allowing the main program to monitor the execution of the test program.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of responding to an event by using a pseudocode program executed by an execution engine comprising:

passing identification information identifying an event-response routine to an event detector routine, the event-response routine being a pseudocode routine included in the pseudocode program and including pseudocode instructions for responding to the event;

detecting the event using the event detector routine;

in response to detecting the event, performing the following substeps:

interrupting execution of the pseudocode program by the execution engine;

saving a state of the execution engine, including saving contents of an instruction counter indicating a location in the pseudocode program at which the execution of the pseudocode program was interrupted;

accessing the event-response routine using the identification information;

executing the event-response routine using the execution engine; and restoring the saved state of the execution engine, including the contents of the instruction counter, after the execution engine executes the event-response routine.

2. The method of claim 1, further comprising:

altering an interrupt vector in an interrupt vector table such that the interrupt vector being altered indexes a location of the event detector routine; and debugging a test program using the pseudocode program, wherein the event detected is an interrupt caused by execution of the test program being debugged by the pseudocode program, the interrupt corresponding to the interrupt vector being altered and the detecting step includes the event detector routine using the interrupt vector being altered.

3. The method of claim 1 wherein the event detected is a message directed to a test program being tested by the pseudocode program, and the detecting step includes setting a hook in a message-handling routine of the test program, the hook causing the message directed to the test program to be intercepted by the event detector routine.

4. The method of claim 1, further comprising:

issuing a call to the event detector routine from the pseudocode program, the call including a request to return parameter values to the event-response routine; and passing the parameter values from the event detector routine to the event-response routine.

5. The method of claim 4, further comprising:

dynamically creating a thunk routine associated with the event-response routine, wherein the identification information includes thunk addressing information identifying a location of the thunk routine;

accessing the thunk routine using the thunk addressing information in response to the event being detected by the event detector routine; and causing the execution engine to execute the event-response routine associated with the thunk routine.

6. The method of claim 5, wherein the step of dynamically creating a thunk routine includes:

compiling a source code version of the pseudocode program into the pseudocode program;

creating the thunk routine associated with the even-response routine while compiling the source code version of the pseudocode program; and providing the thunk routine with indexing information identifying a location of the event-response routine within the pseudocode program, the indexing information being used by the thunk routine when causing the execution engine to execute the event-response routine.

7. The method of claim 6, further comprising loading an execution engine data segment that is different than a data segment used by the detector routine, the execution engine data segment being used by the execution engine to execute the event-response routine.

8. A system for responding to an event by using a pseudocode program operating on a computer, comprising:

an execution engine for executing instructions of the pseudocode program, the execution engine having a state defined by information including contents of an instruction counter;

an event-response routine including pseudocode instructions for responding to the event, the event-response routine being part of the pseudocode program;

an event-response dispatcher structured to include:

means for storing a pseudo-address identifying a location of the event-response routine within the pseudocode program;

means for transmitting a dispatcher address identifying a location of the event-response dispatcher;

means for receiving an event detection signal;

means for saving the state of the execution engine, including the contents of the instruction counter, in response to the event detection signal;

means for causing the execution engine to execute the event-response routine in response to the event detection signal, the causing means directing the execution engine to execute the event-response routine indicated by the stored pseudo-address; and means for restoring the stored state of the execution engine including the contents of the instruction counter; and a detector routine structured to include:

means for receiving the dispatcher address;

means for detecting the event;

means for sending the event detection signal to the event-response dispatcher using the dispatcher address to thereby cause the execution engine to execute the event-response routine.

9. The system of claim 8 wherein the detector routine includes an interrupt detector for detecting the event when the event is an interrupt.

10. The system of claim 9 further including an interrupt handler routine for detecting the interrupt and notifying the detector routine of the interrupt.

11. The system of claim 9 further including means for altering an interrupt vector table such that the interrupt is directed to the detector routine.

12. The system of claim 8 wherein the event detected is a message directed to a test program being tested by the pseudocode program and the detector routine includes means for setting a hook in a message-handling routine of the test program, the hook causing a message directed to the test program to be intercepted by the detector routine.

13. The system of claim 8, wherein the event-response dispatcher includes a thunk routine that receives parameters from the detector routine and passes the parameters to the event-response routine.

14. The system of claim 13, further comprising:

a compiler structured to create the thunk routine while compiling a source code version of the pseudocode program into the pseudocode program and structured to give to the thunk routine indexing information identifying a location of the event-response routine within the pseudocode program, the indexing information being used by the thunk routine to cause the execution engine to execute the event-response routine.

15. The system of claim 14, wherein the thunk routine includes means for loading an execution engine data segment that is different than a data segment used by the detector routine, the execution engine data segment being used by the execution engine to execute the event-response routine.

16. A method of responding to an event by using a pseudocode program being executed by an execution engine, comprising:

passing to an event-response dispatcher a pseudo-address identifying a location of a pseudocode event-response routine within the pseudocode program, the event-response routine including instructions for responding to the event;

passing dispatcher addressing information identifying a location of the event-response dispatcher to an event detector;

detecting the event using the event detector;

sending a detection signal to the event-response dispatcher using the dispatcher addressing information;

stopping execution of the pseudocode program;

saving contents of an instruction counter indicating where in the pseudocode program the execution engine stopped executing the pseudocode program;

accessing the event-response routine using the pseudo-address of the event-response routine;

causing the execution engine to execute the instructions of the event-response routine; and restoring the contents of the instruction counter after the execution engine executes the instructions of the event-response routine.

17. The method of claim 16, further comprising:

compiling a source code version of the pseudocode program into the pseudocode program;

creating a thunk routine associated with the event-response routine while compiling the source code version of the pseudocode program, the thunk routine being included in the event-response dispatcher; and wherein the step of passing the pseudo-address of the event-response routine to the event-response dispatcher includes passing the pseudo-address to the thunk routine while compiling the source code version of the pseudocode program.

18. The method of claim 16, further comprising:

issuing a call to the event detector from the pseudocode program, the call including a request to return parameter values to the event-response routine; and passing the parameter values from the event detector to the event-response routine via the event-response dispatcher.

19. The method of claim 16, further comprising:

storing a plurality of pseudo-addresses in a pseudo-address table, the plurality including the pseudo-address of the event-response routine;

passing identification information identifying the event-response routine to the event detector;

passing the identification information to the event-response dispatcher in response to the event detector detecting the event; and looking up the pseudo-address of the event-response routine using the identification information as an index into pseudo-address table to enable the event-response routine to be accessed.

20. The method of claim 1 wherein:

the event-response routine is a first pseudocode event-response routine that passes to a dispatcher a first pseudo-address identifying the location of the first pseudocode event-response routine within the pseudocode program;

the pseudocode program further includes a second pseudocode event-response routine that passes to the dispatcher a second pseudo-address identifying the location of the second pseudocode event-response routine within the pseudocode program;

the method further includes passing an address of the dispatcher to the event detector routine; and in response to detecting the event, the event detector routine uses the dispatcher address to notify the dispatcher that the event was detected, the dispatcher determines whether the event is associated with the first pseudocode event-response routine or the second pseudocode event-response routine, and the dispatcher accesses one of the first and second pseudocode event-response routines using one of the first and second pseudo-addresses passed to the dispatcher.

21. The system of claim 8 wherein the event-response routine is a first pseudocode event-response routine and the pseudo-address is a first pseudo-address, the pseudocode program further including:

a second pseudocode event-response routine that passes to the event-response dispatcher a second pseudo-address identifying the location of the second pseudocode event-response routine within the pseudocode program, wherein the event-response dispatcher includes means for determining which of the first and second pseudocode event-response routines is associated with the event such that the event-response dispatcher can cause the execution engine to execute the first event-response routine indicated by the first pseudo-address.

* * * * *